US012666402B2

(12) United States Patent
Kang et al.

(10) Patent No.: US 12,666,402 B2
(45) Date of Patent: Jun. 23, 2026

(54) METHOD AND APPARATUS FOR TRANSMISSION AND RECEPTION USING CONFIGURED GRANT IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Taeseop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 18/333,829

(22) Filed: Jun. 13, 2023

(65) Prior Publication Data

US 2023/0403682 A1     Dec. 14, 2023

(30) Foreign Application Priority Data

Jun. 13, 2022     (KR) ........................ 10-2022-0071730

(51) Int. Cl.
*H04W 72/02*          (2009.01)
*H04L 1/1607*         (2023.01)
(Continued)

(52) U.S. Cl.
CPC ........... *H04W 72/02* (2013.01); *H04L 1/1642* (2013.01); *H04W 72/0446* (2013.01); *H04W 72/0453* (2013.01)

(58) Field of Classification Search
CPC ............. H04W 72/02; H04W 72/0453; H04W 72/0446; H04L 1/1642
See application file for complete search history.

(56) References Cited

U.S. PATENT DOCUMENTS 10,306,671 B2     5/2019  Li et al.
2020/0314859 A1   10/2020 Choe et al.
(Continued)

FOREIGN PATENT DOCUMENTS

EP          4084564 A1 * 11/2022  ............ H04W 72/23
WO       2022/031718 A1   2/2022
(Continued)

OTHER PUBLICATIONS

International Search Report and Written Opinion dated Sep. 19, 2023, issued in International Patent Application No. PCT/KR2023/008088.
(Continued)

*Primary Examiner* — Brenda H Pham
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by a terminal in a wireless communication system is provided. The method includes receiving, from a base station, configuration information associated with a set of a plurality of downlink resources, the set being configured to occur periodically, monitoring the plurality of downlink resources of the set in a period for receiving downlink data, wherein the plurality of downlink resources are monitored sequentially, and in case that the downlink data is received in a downlink resource of the set in the period, skipping monitoring of the remaining one or more downlink resources of the set in the period.

13 Claims, 20 Drawing Sheets

(51) Int. Cl.
    *H04W 72/0446*     (2023.01)
    *H04W 72/0453*     (2023.01)

(56)             References Cited

U.S. PATENT DOCUMENTS

| | | | |
|---|---|---|---|
| 2022/0007336 A1* | 1/2022 | Sun | H04L 1/0003 |
| 2022/0030619 A1* | 1/2022 | Huang | H04W 72/0453 |
| 2022/0070837 A1 | 3/2022 | Yang et al. | |
| 2022/0124623 A1 | 4/2022 | Seo et al. | |
| 2022/0183046 A1 | 6/2022 | Xue et al. | |
| 2023/0015168 A1* | 1/2023 | Ye | H04L 1/0009 |
| 2023/0189291 A1 | 6/2023 | Jiang et al. | |

FOREIGN PATENT DOCUMENTS

| | | |
|---|---|---|
| WO | 2022/042752 A1 | 3/2022 |
| WO | 2022/082738 A1 | 4/2022 |

OTHER PUBLICATIONS

Samsung, MAC Running CR for NR IIOT, 3GPP Draft; R2-1916352, 3GPP TSG-RAN2 Meeting #108, Feb. 16, 2021, XP051977822.
Extended European Search Report dated Aug. 14, 2025, issued in European Patent Application No. 23824195.4.

* cited by examiner

Group/Set of configured DL resources
(only one resource amongst the
group/set is used by gNB for DL data)

FIG. 13

| DRX Active Time | DRX Inactive Time |
|---|---|

<------------------------------------DRX Cycle------------------------------------->

☒  PMOs as per the search space configuration monitored during inactive time

Group/Set of configured UL resources
(only one resource amongst the
group/set is used by UE for UL data)

METHOD AND APPARATUS FOR TRANSMISSION AND RECEPTION USING CONFIGURED GRANT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0071730, filed on Jun. 13, 2022, in the Korean Intellectual Property Office, the disclosure of which is incorporated by reference herein in its entirety.

BACKGROUND

1. Field

The disclosure relates to wireless communication systems. More particularly, the disclosure relates to a method and an apparatus for transmission and reception using a configured grant in a wireless communication system.

2. Description of Related Art

5th generation (5G) mobile communication technologies define broad frequency bands such that high transmission rates and new services are possible, and may be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (e.g., service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, configuration information associated with a set of a plurality of downlink (DL) resources, the set being configured to occur periodically, monitoring the plurality of downlink resources of the set in a period for receiving downlink data, the plurality of downlink resources being monitored sequentially, and in case that the downlink data is received in a downlink resource of the set in the period, skipping monitoring of the remaining one or more downlink resources of the set in the period.

In an embodiment, the downlink resource is selected from among the plurality of downlink resources of the set based on a packet arrival.

In accordance with another aspect of the disclosure, a method performed by a base station in a wireless communication system is provided. The method includes determining a downlink resource from among a set of a plurality of downlink resources, based on a packet arrival, the remaining one or more downlink resources of the set not being configured for transmitting downlink data, transmitting, to a terminal, configuration information associated with the set of the plurality of downlink resources, the set being configured to occur periodically, and transmitting, to the terminal, the downlink data in the determined downlink resource.

In accordance with another aspect of the disclosure, a terminal in a wireless communication system is provided. The terminal includes receive, from a base station via the transceiver, configuration information associated with a set of a plurality of downlink resources, the set being configured to occur periodically, monitor the plurality of downlink resources of the set in a period for receiving downlink data, the plurality of downlink resources being monitored sequentially, and in case that the downlink data is received in a downlink resource of the set in the period, skip monitoring of the remaining one or more downlink resources of the set in the period.

In accordance with another aspect of the disclosure, a base station in a wireless communication system is provided. The base station includes a transceiver, and at least one processor coupled with the transceiver and configured to determine a downlink resource from among a set of a plurality of downlink resources, based on a packet arrival, wherein the remaining one or more downlink resources of the set not being configured for transmitting downlink data, transmit, to a terminal via the transceiver, configuration information associated with the set of the plurality of downlink resources, the set being configured to occur periodically, and transmit, to the terminal via the transceiver, the downlink data in the determined downlink resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 illustrates monitoring of PDCCH in inactive time according to an embodiment of the disclosure;

Throughout the drawings, like reference numbers will be understood to refer to like parts, components, and structures.

DETAILED DESCRIPTION

Figure 1:
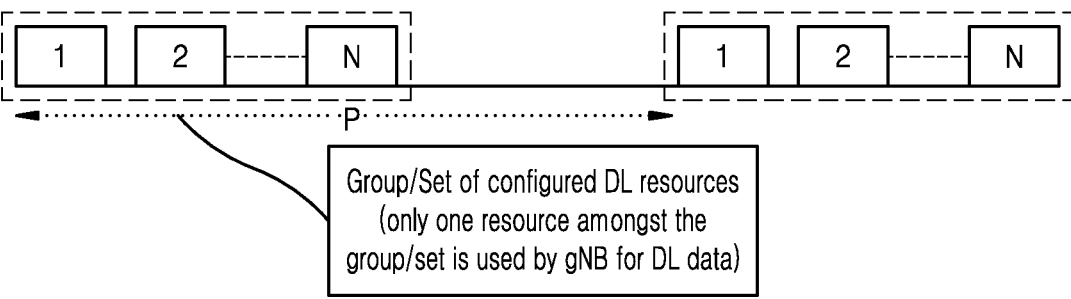
FIG. 1 illustrates a set of downlink resources configured to occur periodically according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and may be changed according to the intent or commonly used methods of users or operators. Accordingly, definitions of the terms are understood based on the entire descriptions of the disclosure.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a non-transitory computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks are also executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" includes elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

The disclosure relates to a method and an apparatus for transmission and reception using a configuration grant in a wireless communication system.

The disclosure relates to a wireless communication system. Specifically, the disclosure relates to, a method and a system for discontinuous reception in connected state.

To meet the demand for wireless data traffic having increased since deployment of 4th generation (4G) communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Carrier aggregation (CA)/Multi-connectivity in fifth generation wireless communication system: The fifth generation wireless communication system, supports standalone mode of operation as well dual connectivity (DC). In DC a multiple receive (Rx)/transmit (Tx) UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network (CN). NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either evolved-universal terrestrial radio access network (E-UTRA) (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access, contention free random access and each of these may be one 2 step or 4 step random access.

BWP operation in fifth generation wireless communication system: In fifth generation wireless communication system bandwidth adaptation (BA) is supported. With BA, the receive and transmit bandwidth of a UE need not be as large as the bandwidth of the cell and may be adjusted: the width may be ordered to change (e.g. to shrink during period of low activity to save power); the location may move in the frequency domain (e.g. to increase scheduling flexibility); and the subcarrier spacing may be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP, i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

RRC states in fifth generation wireless communication system: In the fifth generation wireless communication system, RRC may be in one of the following states: RRC_IDLE, RRC_INACTIVE, and RRC_CONNECTED. A UE is either in RRC_CONNECTED state or in RRC_I-NACTIVE state when an RRC connection has been established. If this is not the case, i.e., no RRC connection is established, the UE is in RRC_IDLE state. The RRC states may further be characterized as follows:

In the RRC_IDLE, a UE specific discontinuous reception (DRX) may be configured by upper layers. The UE monitors Short Messages transmitted with paging radio network temporary identifier (P-RNTI) over downlink control information (DCI); monitors a Paging channel for CN paging using 5G-S-temporary mobile subscriber identity (5G-S-TMSI); performs neighboring cell measurements and cell (re-)selection; acquires system information and may send SI request (if configured); performs logging of available measurements together with location and time for logged measurement configured UEs.

In RRC_INACTIVE, a UE specific DRX may be configured by upper layers or by RRC layer; UE stores the UE Inactive access stratum (AS) context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and may send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH may be used to for: Activation and deactivation of configured PUSCH transmission with configured grant; Activation and deactivation of PDSCH semi-persistent transmission; Notifying one or more UEs of the slot format; Notifying one or more UEs of the PRB(s) and orthogonal frequency-division multiplexing (OFDM) symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations is signaled by GNB for each configured BWP of serving cell wherein each search configuration is uniquely identified by a search space identifier. Search space identifier is unique amongst the BWPs of a serving cell. Identifier of search space configuration to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame}) + x - \text{Monitoring-offset-PDCCH-slot}) \mod (\text{Monitoring-periodicity-PDCCH-slot}) = 0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP of serving cell wherein each coreset configuration is uniquely identified by an coreset identifier. Coreset identifier is unique amongst the BWPs of a serving cell. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of Transmission configuration indicator (TCI) states. One DL RS ID (synchronization signal block (SSB) or channel state information reference signal (CSI RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi co-located (QCLed) with SSB/CSI RS of TCI state) used by GNB for transmission of PDCCH in the PDCCH monitoring occasions of a search space.

Downlink scheduling in fifth generation wireless communication system: In the downlink, the gNB may dynamically allocate resources to UEs via the cell radio network temporary identifier (C-RNTI) on PDCCH(s). A UE always monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB may configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB may allocate downlink resources for the initial hybrid automatic repeat request (HARQ) transmissions to UEs: RRC defines the periodicity of the configured downlink assignments while PDCCH addressed to configured scheduling radio network temporary identifier (CS-RNTI) may either signal and activate the configured downlink assignment, or deactivate it; i.e. a PDCCH addressed to CS-RNTI indicates that the downlink assignment may be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise a downlink reception according to the configured downlink assignment is assumed, if activated. The UE may be configured with up to 8 active configured downlink assignments for a given BWP of a serving cell. When more than one is configured:

The network decides which of these configured downlink assignments are active at a time (including all of them); and Each configured downlink assignment is activated separately using a DCI command and deactivation of configured downlink assignments is done using a DCI command, which may either deactivate a single configured downlink assignment or multiple configured downlink assignments jointly.

Uplink scheduling in fifth generation wireless communication system: In the uplink, the gNB may dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB may configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation. In addition, with Configured Grants, the gNB may allocate uplink resources for the initial HARQ transmissions and HARQ retransmissions to UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI may either signal and activate the configured uplink grant, or deactivate it; i.e., a PDCCH addressed to CS-RNTI indicates that the uplink grant may be implicitly reused according to the periodicity defined by RRC, until deactivated.

If the UE is not configured with enhanced intra-UE overlapping resources prioritization, the dynamically allocated uplink transmission overrides the configured uplink grant in the same serving cell, if they overlap in time. Otherwise an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or may be multiplexed in MAC protocol data units (PDUs) associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or may be multiplexed in MAC PDU associated with the overlapping resource. In case the MAC PDU associated with a deprioritized transmission has already been generated, the UE keeps it stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant may either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which may either deactivate a single configured grant configuration or multiple configured grant configurations jointly.

When SUL is configured, the network should ensure that an active configured uplink grant on SUL does not overlap in time with another active configured uplink grant on the other UL configuration.

For both dynamic grant and configured grant, for a transport block, two or more repetitions may be in one slot, or across slot boundary in consecutive available slots with each repetition in one slot. For both dynamic grant and configured grant Type 2, the number of repetitions may be also dynamically indicated in the L1 signaling. The dynamically indicated number of repetitions shall override the RRC configured number of repetitions, if both are present.

eXtended Reality (XR) is a term for different types of realities and refers to all real-and-virtual combined environments and human-machine interactions generated by computer technology and wearables. It includes following representative forms and the areas interpolated among them: Augmented Reality (AR); Mixed Reality (MR); Virtual Reality (VR). In case of applications/services such as XR, the DL packet arrival for XR may not align with configured downlink assignment due to jitter. Configured downlink assignments at short periodicity may reduce impact due to jitter but it increased UE's power consumption as UE tries to receive and decode TB in every configured downlink assignment.

So enhanced method of transmission and reception using configured grants is needed.

FIG. 1 illustrates a set of downlink resources configured to occur periodically according to an embodiment of the disclosure.

Referring to FIG. 1, a set of 'N' downlink resources (or PDSCH resources or configured downlink grants) are configured to occur periodically (with periodicity P), where N is an integer >1, as shown in FIG. 1. Amongst each set of 'N' configured downlink resources, only one is used for downlink transmission of transport block (TB) over PDSCH. Each downlink resource (or PDSCH resource or configured downlink grant) is basically a set of PRBs spanning over one or more OFDM symbols, for transmitting a transport block by gNB.

Figure 2:
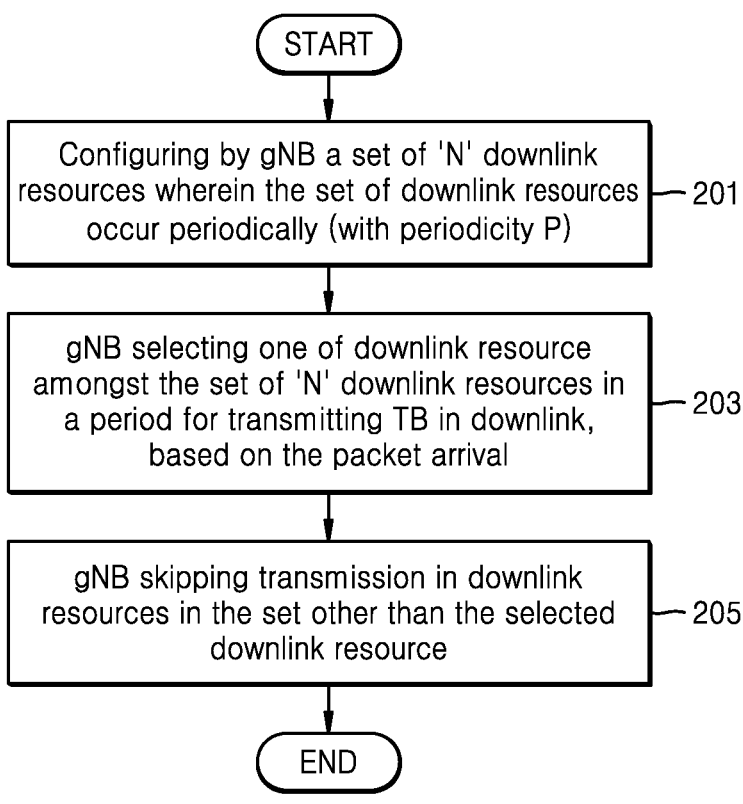
FIG. 2 illustrates a flow chart describing a method performed by a base station according to an embodiment of the disclosure.

Depending on the packet arrival time, network (i.e. gNB) uses one of these 'N' configured downlink resources (or PDSCH resources or configured downlink grants) for transmitting TB in downlink. For example, in FIG. 1, if packet arrives before (or sufficiently before to prepare the TB) configured DL resource 1, the gNB may use configured DL resource 1 for transmitting TB in downlink; and if packet arrives between configured DL resource 1 and 2, the gNB may use configured DL resource 2 (if packet arrives sufficiently before DL resource 2 to prepare the TB). FIG. 2 is an example of operation at gNB.

FIG. 2 illustrates a flow chart describing a method performed by a base station according to an embodiment of the disclosure.

Referring to FIG. 2, in operation 201, the base station may configure the set of downlink resources, wherein the set of the downlink resources occur periodically.

In operation 203, the base station may select one of the downlink resources from the set of downlink resources in a period for transmitting the TB in downlink, based on the packet arrival.

In operation 205, the base station may skip transmission in downlink resources in the set other than the selected downlink resource.

Figure 3:
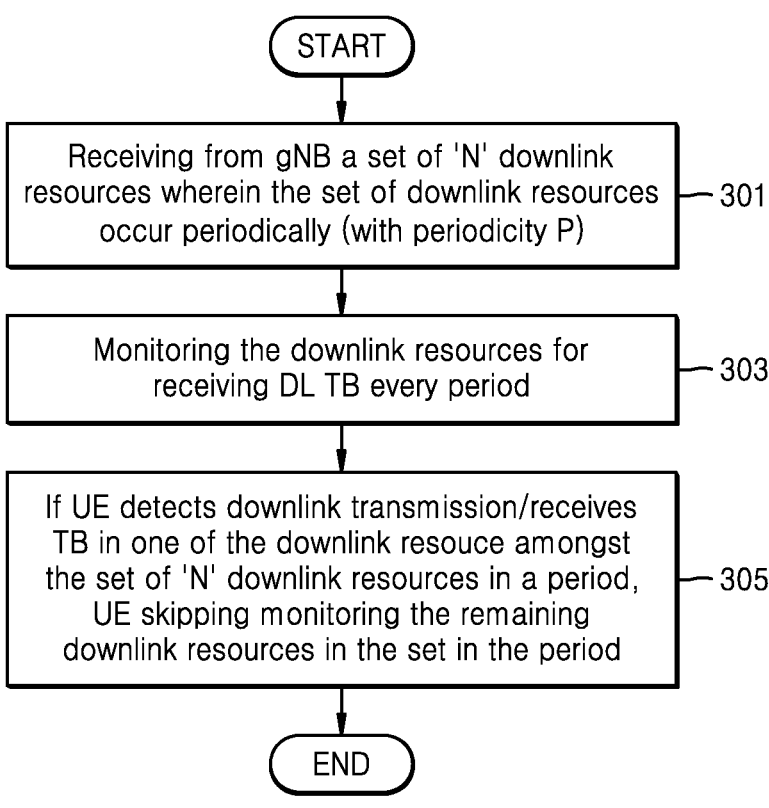
FIG. 3 illustrates a flow chart describing a method performed by a terminal according to an embodiment of the disclosure.

FIG. 3 illustrates a flow chart describing a method performed by a terminal according to an embodiment of the disclosure.

Referring to FIG. 3, in operation 301, the terminal may receive, from the base station, the set of downlink resources, wherein the set of the downlink resources occur periodically.

In operation 303, the terminal may monitor the downlink resources for receiving DL TB every period.

In operation 305, if UE detects downlink transmission/receives TB in one of the downlink resource amongst the set of 'N' downlink resources, UE does not monitor the remaining downlink resources in the set. For example, if UE detects downlink transmission/receives TB in configured DL resource 1, the UE may skip monitoring remaining configured DL resources 2 to N of the set in a period P. FIG. 3 is an example of operation at UE.

These 'N' configured downlink resources may be TDMed. One or multiple of these resources may be there in one slot. The total duration of these N configured downlink resources may span one or multiple slots. The gap between these N configured downlink resources may be in units of slots/symbols. The gap may also be zero. The gap may be same between each of these N configured downlink resources or may be different. The gap may be signaled by the gNB in dedicated signaling message (e.g. RRC Reconfiguration message) or in DCI. In an embodiment, instead of gap, repetition interval may be configured to indicate these N configured downlink resources. The frequency domain resources (PRBs) occupied by each of these N configured downlink resources may be same or different. The time (slot/symbols/subframes/frames etc.) and frequency locations (PRBs, e.g. starting PRB index, ending PRB index/ number of PRBs) of these N configured downlink resources are signaled by the gNB in dedicated signaling message (e.g. RRC Reconfiguration message) or in DCI (PDCCH addressed to C-RNTI or CS-RNTI or another UE specific RNTI). The periodicity is signaled by the gNB in dedicated signaling message (e.g. RRC Reconfiguration message).

Figure 4:
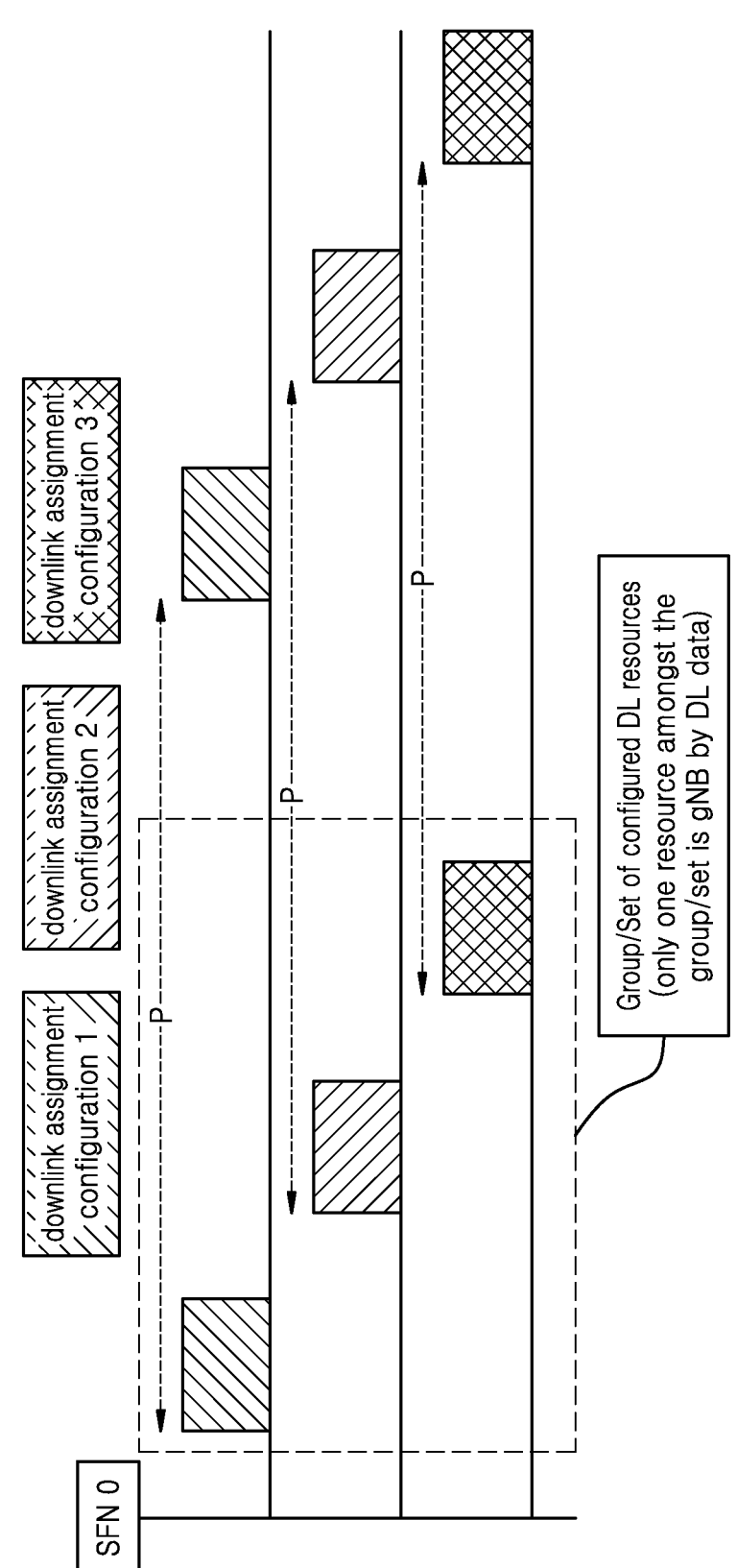
FIG. 4 illustrates downlink assignment configurations belonging to the same group according to an embodiment of the disclosure.

FIG. 4 illustrates downlink assignment configurations belonging to the same group according to an embodiment of the disclosure.

Referring to FIG. 4, in order to configure periodically occurring set of 'N' downlink resources, the network (i.e. gNB) may signal a plurality of downlink assignment configurations. Each downlink assignment configuration includes periodicity and indicates time (slot/symbols/subframe/frame etc.) and frequency resources (PRBs) of one downlink resource which periodically occurs at indicated periodicity. The gNB indicates which of these plurality of downlink assignment configurations belongs to the same group. This may be done by including group or set index in the configuration. The periodicity indicated in each of the downlink assignment configuration which belongs to the same group may be same. If 'N' downlink assignment configurations belong to the same group, set of 'N' downlink resources includes one downlink resource from each of these configurations. An example of 3 downlink assignment configurations belonging to the same group is shown in FIG. 4.

In an alternate embodiment, in order to configure periodically occurring set of 'N' downlink resources, the network (i.e. gNB) may signal a plurality of downlink assignment configurations. Each downlink assignment configuration includes periodicity. The gNB indicates which of these plurality of downlink assignment configurations belongs to the same group. This may be done by including group or set index in the configuration. The periodicity indicated in each of the downlink assignment configuration which belongs to the same group may be same. PDCCH addressed to CS_RNTI or another RNTI for activation, indicates time (slot/symbols/subframe/frame etc.) and frequency resources (PRBs) of downlink resource which periodically occurs at periodicity indicated by RRC for a downlink assignment configuration. If 'N' downlink assignment configurations belong to the same group, the set of 'N' downlink resources include one downlink resource corresponding to each of these configuration.

In an alternate embodiment, in order to configure periodically occurring set of 'N' downlink resources, the network (i.e. gNB) may signal downlink assignment configuration(s). A downlink assignment configuration includes periodicity. The downlink assignment configuration is associated with a set of N downlink resources occurring periodically at the indicated periodicity. The downlink assignment configuration includes time (slot/symbols/subframe/frame etc.) and frequency resources (PRBs) of each of the N downlink resources.

In an alternate embodiment, in order to configure periodically occurring set of 'N' downlink resources, the network (i.e. gNB) may signal downlink assignment configuration(s). A downlink assignment configuration includes periodicity. The downlink assignment configuration is associated with a set of N downlink resources occurring periodically at the indicated periodicity. PDCCH addressed to CS_RNTI or another RNTI for activation, indicates time (slot/symbols/subframe/frame etc.) and frequency resources (PRBs) of 'N' downlink resources corresponding to downlink assignment configuration. These N downlink resources occur periodically at the periodicity indicated by RRC.

Figure 5:
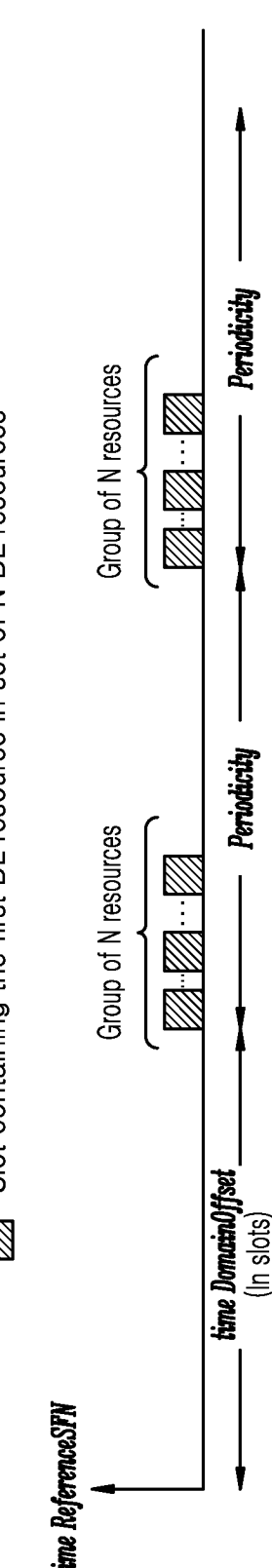
FIG. 5 illustrates a set of downlink resources configured to occur periodically by a signal from a base station according to an embodiment of the disclosure.

FIG. 5 illustrates a set of downlink resources configured to occur periodically by a signal from a base station according to an embodiment of the disclosure.

In an alternate embodiment, in order to configure periodically occurring set of 'N' downlink resources, the network may signal timeReferenceSFN: SFN used for determination of the offset of a resource in time domain.

timeDomainOffset: Offset of a resource with respect to SFN=timeReferenceSFN in time domain;

timeDomainAllocation: Allocation of configured downlink grant in time domain which contains startSymbolAndLength periodicity: periodicity The first DL resource in the set of 'N' DL resources occurs in slot which starts at an offset timeDomainOffset from timeReferenceSFN and subsequently the first DL resource in the set of 'N' DL resources occurs at periodicity given by periodicity as shown in FIG. 5. The other slots containing remaining DL resources may be indicated by signaling parameter interval/gap between slots including DL resource. In each slot having DL resource, DL resource occurs in at least one symbol indicated by startSymbolAndLength or startSymbol and total number of symbols of resource is given by length in startSymbolAndLength. In an alternate embodiment, instead of timeDomainOffset and timeReferenceSFN, starting SFN may be indicated. The first DL resource in the first set of 'N' DL resources occurs in radio frame given by starting frame and in slot indicated by starting slot number and subsequently the first DL resource in the other set of 'N' DL resources occurs at periodicity given by periodicity.

Figure 6:
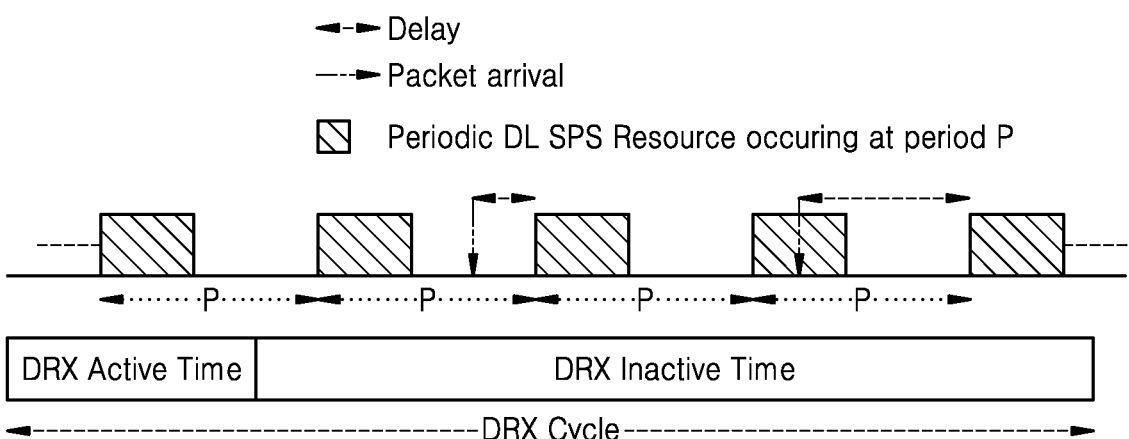
FIG. 6 illustrates a packet arrival and occasion of downlink resource related to transmission of a packet according to an embodiment of the disclosure.

FIG. 6 illustrates a packet arrival and occasion of downlink resource related to transmission of a packet according to an embodiment of the disclosure.

Referring to FIG. 6, in case of downlink semi-persistent scheduling, the network may change the activated DL assignment/resource location using PDCCH. However, when the UE is not in active time, the UE may not monitor PDCCH and receive DL TB in assigned DL assignment/resource. As a result, if packet arrival is not aligned with occasion of DL SPS resource, there will be delay in transmitting the packet as shown in FIG. 6.

In order to handle jitter, in an embodiment of the disclosure, it is proposed that while the UE is not in active time, the UE may monitor PDCCH in one or more PDCCH monitoring occasions before and/or after the activated DL assignment/resource. This PDCCH may be used to change DL assignment/resource occasion or assign a Dynamic grant in a case where DL packet arrives earlier or later than DL assignment/resource occasion. The gNB may signal search space configuration for this PDCCH monitoring in inactive time (or search space amongst the list of search space configurations to use for this purpose) to the UE in dedicated signaling message (e.g. RRC Reconfiguration message). In an embodiment, search space configuration(s) for this PDCCH monitoring in inactive time may be the search space configuration(s) which the UE uses to receive PDCCH for DL assignment/resource in active state. Note that in an embodiment, the search space configuration is per BWP and the UE applies the configuration of active DL BWP.

Figure 7:
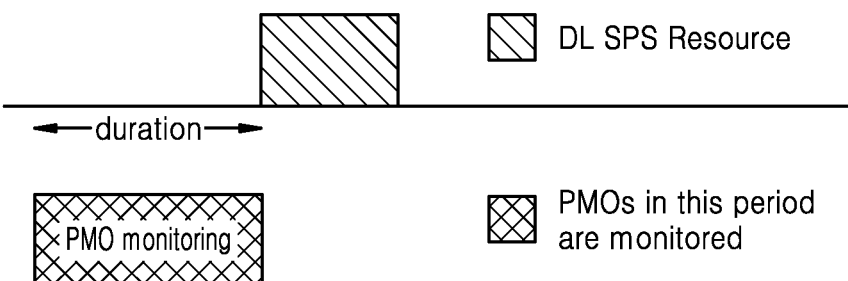
FIG. 7 illustrates an example of physical downlink control channel (PDCCH) monitoring in inactive state before a DL semi-persistent scheduling (SPS) resource according to an embodiment of the disclosure.

FIG. 7 illustrates an example of PDCCH monitoring in inactive state before the DL SPS resource according to an embodiment of the disclosure.

Referring to FIG. 7, the UE may monitor PDCCH monitoring occasion(s) occurring in duration before the DL SPS resource. The duration may be signaled by the gNB (e.g. in dedicated signaling message such as RRC Reconfiguration message). If DL SPS resource starts in slot X and duration is 5 slots, the UE may monitor PDCCH monitoring occasion(s) occurring in slots X−5 to X−1. The location of PDCCH monitoring occasion(s) within the duration is determined based on search space configuration used for this PDCCH monitoring.

Figure 8:
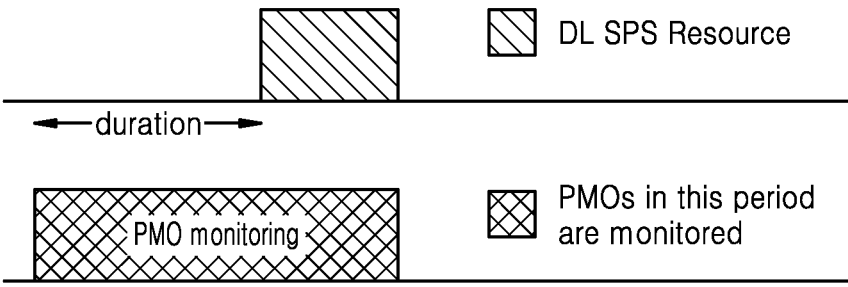
FIG. 8 illustrates another example of PDCCH monitoring in inactive state before the DL SPS resource according to an embodiment of the disclosure.

FIG. 8 illustrates another example of PDCCH monitoring in inactive state before the DL SPS resource according to an embodiment of the disclosure.

Referring to FIG. 8, the UE may monitor PDCCH monitoring occasion(s) occurring in duration before the DL SPS resource and also during the slots of DL SPS resource. The duration may be signaled by the gNB (e.g. in dedicated signaling message such as RRC Reconfiguration message). If DL SPS resource starts in slot X and duration is 5 slots, the UE may monitor PDCCH monitoring occasion(s) occurring in slots X−5 to X−1 and slot X. The location of PDCCH monitoring occasion(s) within the duration is determined based on search space configuration used for this PDCCH monitoring.

Figure 9:
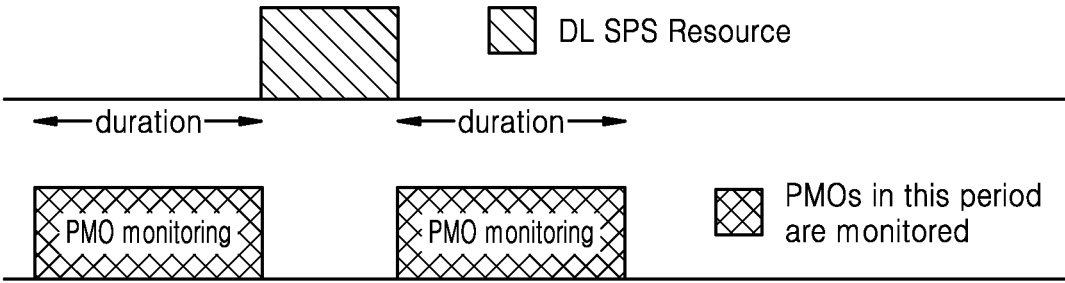
FIG. 9 illustrates an example of PDCCH monitoring in inactive state before and after the DL SPS resource according to an embodiment of the disclosure.

FIG. 9 illustrates an example of PDCCH monitoring in inactive state before and after the DL SPS resource according to an embodiment of the disclosure.

Referring to FIG. 9, the UE may monitor PDCCH monitoring occasion(s) occurring in duration before and after the DL SPS resource. The duration may be signaled by the gNB (e.g. in dedicated signaling message such as RRC Reconfiguration message). If DL SPS resource starts in slot X and duration is 5 slots, the UE may monitor PDCCH monitoring occasion(s) occurring in slots X–5 to X–1 and X+1 to X+5. The value of duration may be different before and after the DL SPS resource. The location of PDCCH monitoring occasion(s) within the duration is determined based on search space configuration used for this PDCCH monitoring.

Figure 10:
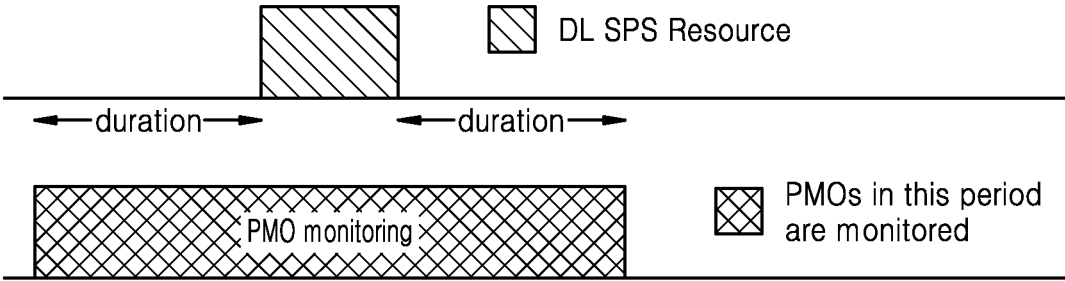
FIG. 10 illustrates an example of PDCCH monitoring in inactive state before and after the DL SPS resource according to an embodiment of the disclosure.

FIG. 10 illustrates an example of PDCCH monitoring in inactive state before and after the DL SPS resource according to an embodiment of the disclosure.

Referring to FIG. 10, the UE may monitor PDCCH monitoring occasion(s) occurring in duration before and after the DL SPS resource and during the DL SPS resource. The duration may be signaled by the gNB (e.g. in dedicated signaling message such as RRC Reconfiguration message). If DL SPS resource starts in slot X and duration is 5 slots, the UE may monitor PDCCH monitoring occasion(s) occurring in slots X–5 to X–1, X, and X+1 to X+5. The value of duration may be different before and after the DL SPS resource. The location of PDCCH monitoring occasion(s) within the duration is determined based on search space configuration used for this PDCCH monitoring.

Figure 11:
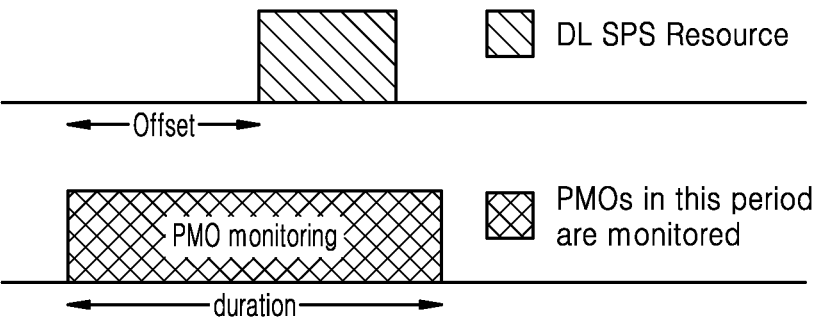
FIG. 11 illustrates an example of PDCCH monitoring in inactive state according to an embodiment of the disclosure.

FIG. 11 illustrates an example of PDCCH monitoring in inactive state according to an embodiment of the disclosure.

Referring to FIG. 11, the UE may monitor PDCCH monitoring occasion(s) occurring in duration which starts at on offset before the DL SPS resource. The duration and offset may be signaled by the gNB (e.g. in dedicated signaling message such as RRC Reconfiguration message). The location of PDCCH monitoring occasion(s) within the duration is determined based on search space configuration used for this PDCCH monitoring.

Figure 12:
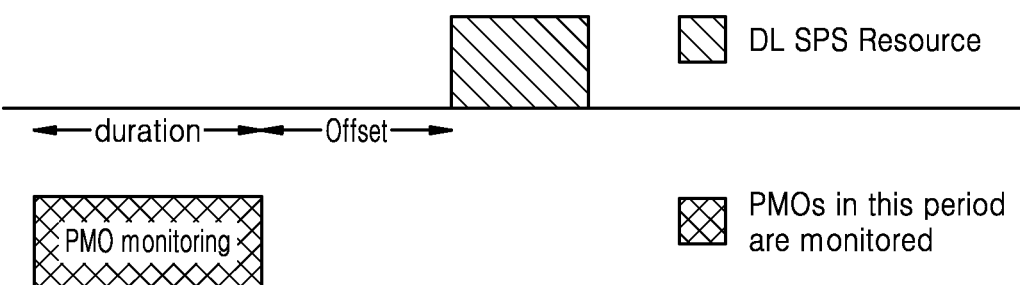
FIG. 12 illustrates another example of PDCCH monitoring in inactive state according to an embodiment of the disclosure.

FIG. 12 illustrates another example of PDCCH monitoring in inactive state according to an embodiment of the disclosure.

Referring to FIG. 12, the UE may monitor PDCCH monitoring occasion(s) occurring in duration which starts at on 'offset+duration' before the DL SPS resource. The duration and offset may be signaled by the gNB (e.g. in dedicated signaling message such as RRC Reconfiguration message). The location of PDCCH monitoring occasion(s) within the duration is determined based on search space configuration used for this PDCCH monitoring.

Figure 13:
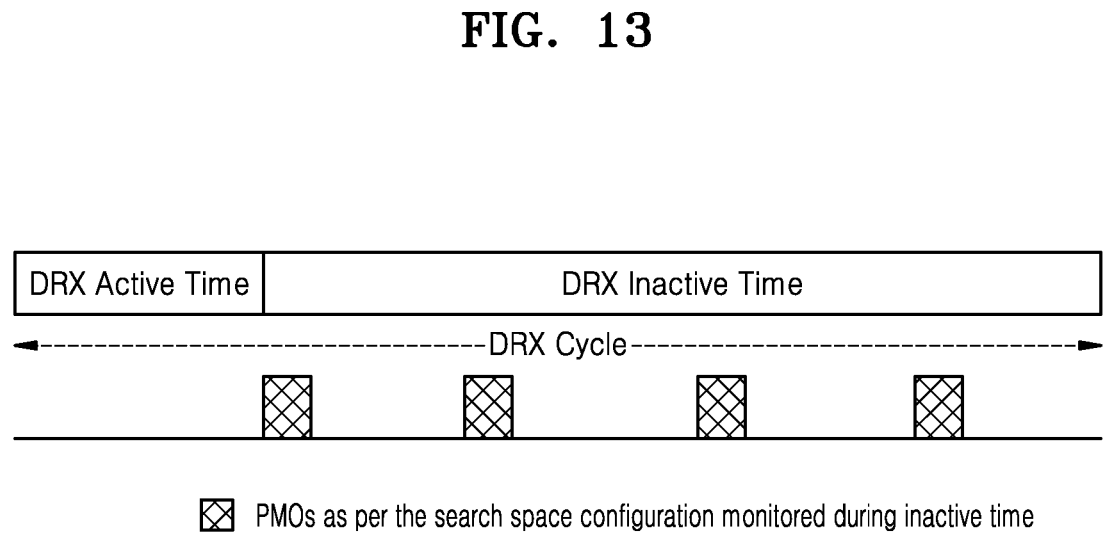

FIG. 13 illustrates monitoring of PDCCH in inactive time according to an embodiment of the disclosure.

Referring to FIG. 13, in order to handle jitter, in an embodiment of this disclosure, it is proposed that while the UE is not in active time, the UE may monitor PDCCH in one or more PDCCH monitoring occasions configured by search space configuration for PDCCH monitoring in inactive time as shown in FIG. 13. This PDCCH may be used to change DL assignment/resource occasion or assign a Dynamic grant in a case where DL packet arrives earlier or later than DL assignment/resource occasion. The gNB may signal search space configuration for this PDCCH monitoring in inactive time (or search space amongst the list of search space configurations to use for this purpose) to the UE in dedicated signaling message (e.g. RRC Reconfiguration message). Note that in an embodiment, the search space configuration is per BWP and UE applies the configuration of active DL BWP.

Figure 14:
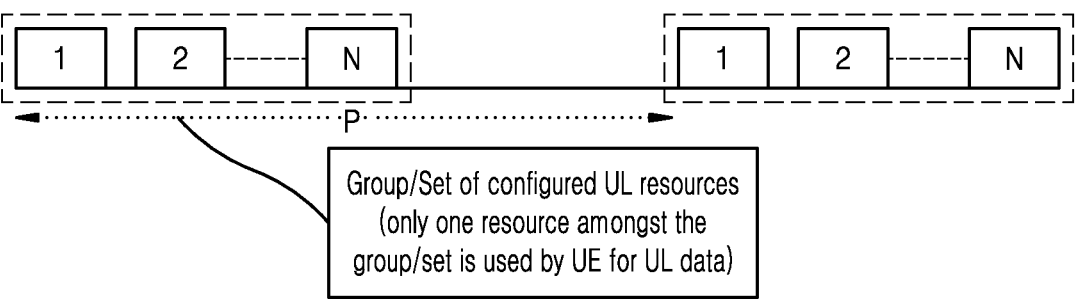
FIG. 14 illustrates a set of uplink (UL) resources configured to occur periodically according to an embodiment of the disclosure.

FIG. 14 illustrates a set of uplink resources configured to occur periodically according to an embodiment of the disclosure.

Referring to FIG. 14, a set of 'N' uplink resources (PUSCH resources or configured UL grants) are configured to occur periodically (with periodicity P), where N is integer >1, as shown in FIG. 14. Amongst each set of 'N' configured uplink resources (PUSCH resources or configured UL grants) only one is used for uplink transmission. Each uplink resource is basically a set of PRBs spanning over one or more OFDM symbols, for transmitting a transport block by UE.

Figure 15:
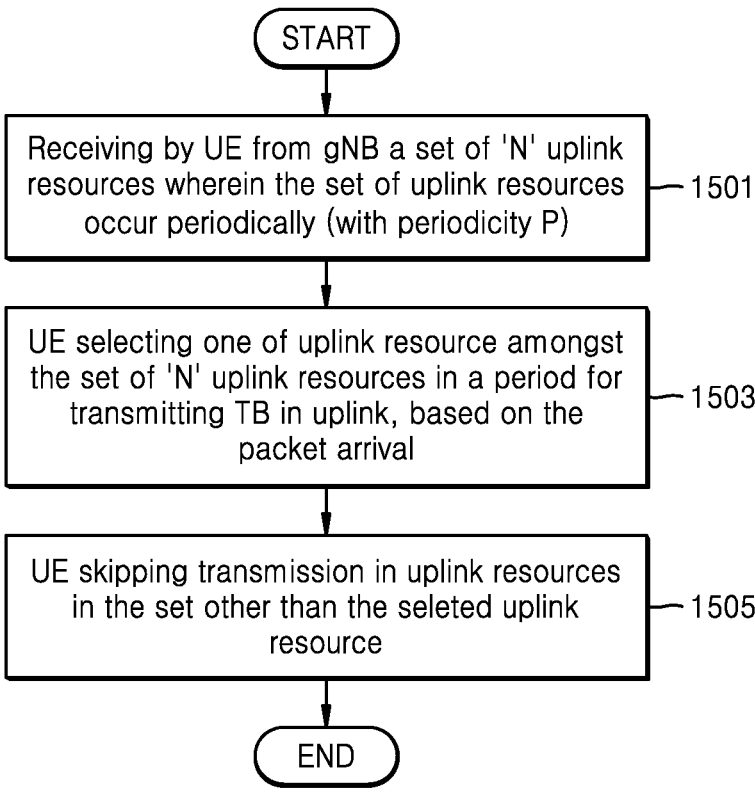
FIG. 15 illustrates a flow chart describing a method performed by a terminal according to an embodiment of the disclosure.

Depending on the packet arrival time, the UE uses one of these 'N' configured uplink resources for transmitting TB in uplink. For example, in FIG. 14, if packet arrive before (or sufficiently before to prepare the TB) configured UL resource 1, the UE may use configured UL resource 1 for transmitting TB in uplink; if packet arrive between configured UL resource 1 and 2, the UE may use configured UL resource 2 (if packet arrives sufficiently before UL resource 2 to prepare the TB). FIG. 15 is an example of operation at UE.

FIG. 15 illustrates a flow chart describing a method performed by a terminal according to an embodiment of the disclosure.

Referring to FIG. 15, in operation 1501, a terminal may receive, from a base station, a set of uplink resources, wherein the set of uplink resources occur periodically.

In operation 1503, the terminal may select one of the uplink resources in a period for transmitting the TB in uplink, based on the packet arrival.

In operation 1505, the terminal may skip transmission in uplink resources other than the selected uplink resource.

Figure 16:
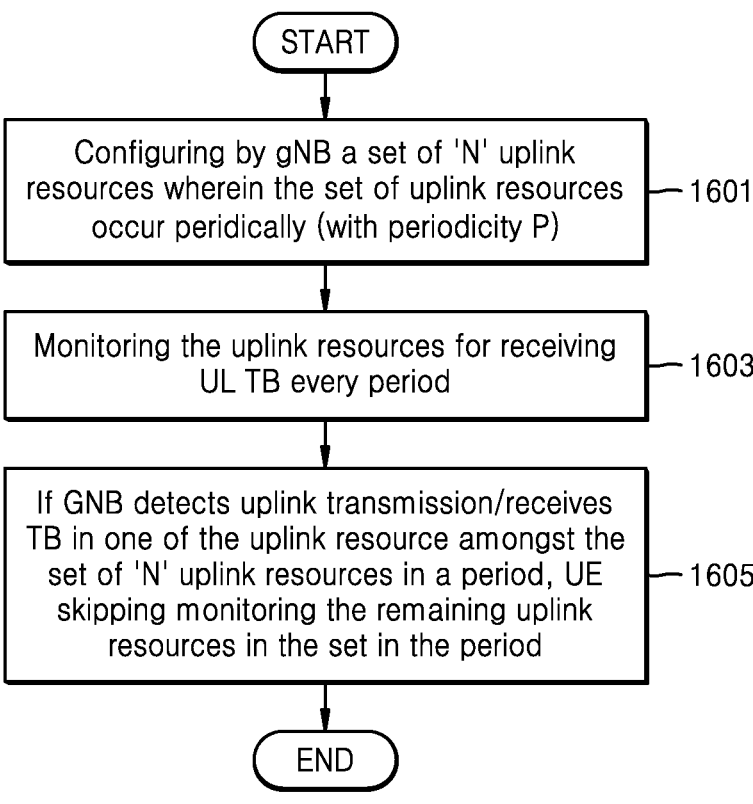
FIG. 16 illustrates a flow chart describing a method performed by a base station according to an embodiment of the disclosure.

FIG. 16 illustrates a flow chart describing a method performed by a base station according to an embodiment of the disclosure.

Referring to FIG. 16, in operation 1601, the base station may configure a set of uplink resources, wherein the set of uplink resources occur periodically.

In operation 1603, the base station may monitor the uplink resources for receiving UL TB every period.

In operation 1605, if the gNB detects uplink transmission/receives TB in one of the uplink resource amongst the set of 'N' uplink resources, the gNB does not monitor the remaining uplink resources in the set. For example, if the gNB detects uplink transmission/receives TB in configured UL resource 1, it skips monitoring remaining configured UL resources 2 to N of the set in a period P. FIG. 16 is an example of operation at the gNB.

These 'N' configured uplink resources may be TDMed. One or multiple of these resources may be there in one slot. The total duration of these N configured uplink resources may span one or multiple slots. The gap between these N configured uplink resources c may n be in units of slots/ symbols. The gap may also be zero. The gap may be same between each of these N configured uplink resources or may be different. The gap may be signaled by the gNB in in dedicated signaling message (e.g. RRC Reconfiguration message) or in DCI. In an embodiment instead of gap, repetition interval can be configured to indicate these N configured uplink resources. The frequency domain resources (PRBs) occupied by each of these N configured uplink resources may be same or different. The time (slot/ symbols/subframes/frames etc.) and frequency locations (PRBs, e.g. starting PRB index, ending PRB index/number of PRBs) of these N configured uplink resources are signaled by the gNB in dedicated signaling message (e.g. RRC Reconfiguration message) or in DCI (PDCCH addressed to C-RNTI or CS-RNTI or another UE specific RNTI). The periodicity is signaled by the gNB in dedicated signaling message (e.g. RRC Reconfiguration message).

Figure 17:
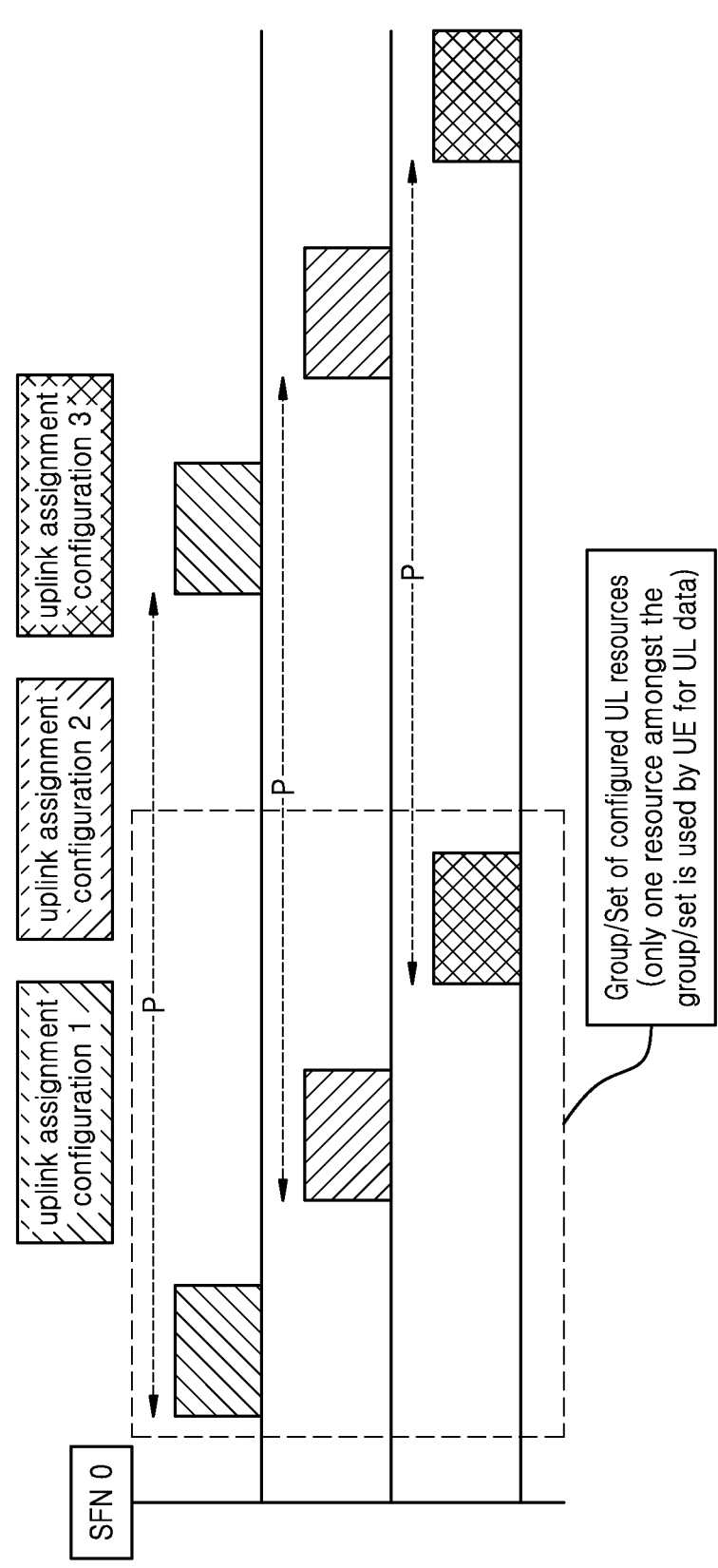
FIG. 17 illustrates an example of uplink assignment configurations belonging to the same group according to an embodiment of the disclosure.

FIG. 17 illustrates an example of uplink assignment configurations belonging to the same group according to an embodiment of the disclosure.

Referring to FIG. 17, in order to configure periodically occurring set of 'N' uplink resources, the network (i.e. gNB) may signal a plurality of uplink assignment configurations. Each uplink assignment configuration includes periodicity and indicates time (slot/symbols/subframe/frame etc.) and frequency resources (PRBs) of one uplink resource which periodically occurs at indicated periodicity. The gNB indicates which of these plurality of uplink assignment configurations belongs to the same group. This may be done by including group or set index in the configuration. The periodicity indicated in each of the uplink assignment configurations which belongs to the same group may be same. If 'N' uplink assignment configurations belong to the same group, the set of 'N' uplink resources include one uplink resource from each of these configuration. An example of 3 uplink assignment configurations belonging to the same group is shown in FIG. 17.

In an alternate embodiment, in order to configure periodically occurring set of 'N' uplink resources, the network (i.e. gNB) may signal a plurality of uplink assignment configurations. Each uplink assignment configuration includes periodicity. The gNB indicates which of these plurality of uplink assignment configurations belongs to the same group. This may be done by including group or set index in the configuration. The periodicity indicated in each of the uplink assignment configurations which belongs to the same group may be same. PDCCH addressed to CS_RNTI or another RNTI for activation, indicates time (slot/symbols/subframe/frame etc.) and frequency resources (PRBs) of uplink resource which periodically occurs at periodicity indicated by RRC for an uplink assignment configuration. If 'N' uplink assignment configurations belong to the same group, the set of 'N' uplink resources include one uplink resource corresponding to each of these configuration.

In an alternate embodiment, in order to configure periodically occurring set of 'N' uplink resources, the network (i.e. gNB) may signal uplink assignment configuration(s). An uplink assignment configuration includes periodicity. The uplink assignment configuration is associated with a set of N uplink resources occurring periodically at the indicated periodicity. The uplink assignment configuration includes time (slot/symbols/subframe/frame etc.) and frequency resources (PRBs) of each of the N uplink resources.

In an alternate embodiment, in order to configure periodically occurring set of 'N' uplink resources, the network (i.e. gNB) may signal uplink assignment configuration(s). An uplink assignment configuration includes periodicity. The uplink assignment configuration is associated with a set of N uplink resources occurring periodically at the indicated periodicity. PDCCH addressed to CS_RNTI or another RNTI for activation, indicates time (slot/symbols/subframe/frame etc.) and frequency resources (PRBs) of 'N' uplink resources corresponding to uplink assignment configuration. These N uplink resources occur periodically at the periodicity indicated by RRC.

Figure 18:
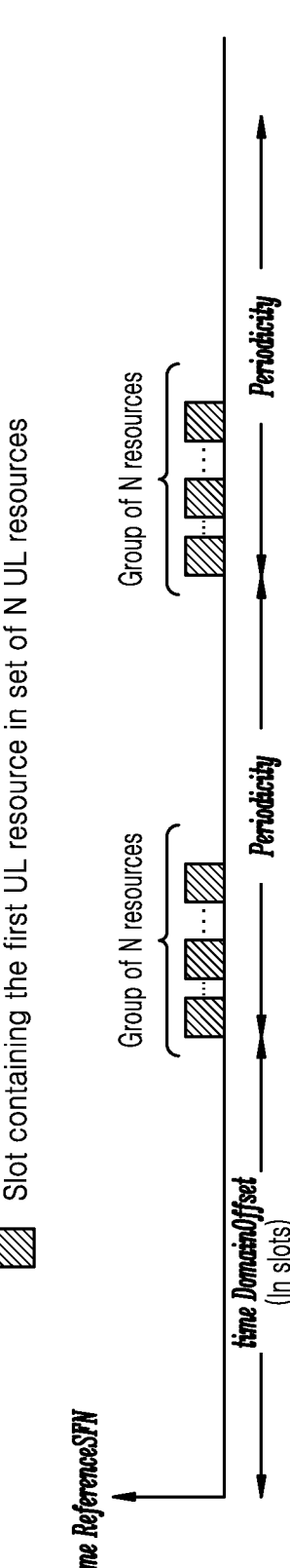
FIG. 18 illustrates a set of uplink resources configured to occur periodically by signal from a base station according to an embodiment of the disclosure.

FIG. 18 illustrates a set of uplink resources configured to occur periodically by signal from a base station according to an embodiment of the disclosure.

Referring to FIG. 18, in an alternate embodiment, in order to configure periodically occurring set of 'N' uplink resources, the network may signal timeReferenceSFN: SFN used for determination of the offset of a resource in time domain.

timeDomainOffset: Offset of a resource with respect to SFN=timeReferenceSFN in time domain;

timeDomainAllocation: Allocation of configured uplink grant in time domain which contains startSymbolAndLength periodicity: periodicity The first UL resource in the set of 'N' UL resources occurs in slot which starts at an offset timeDomainOffset from timeReferenceSFN and subsequently the first UL resource in the set of 'N' UL resources occurs at periodicity given by periodicity as shown in FIG. 18. The other slots containing remaining UL resources may be indicated by signaling parameter interval/gap between slots including UL resource. In each slot having UL resource, UL resource occurs in symbol indicated by startSymbolAndLength or startSymbol and total number of symbols of resource is given by length in startSymbolAndLength. In an alternate embodiment, instead of timeDomainOffset and timeReferenceSFN, starting SFN may be indicated. The first UL resource in the first set of 'N' UL resources occurs in radio frame given by starting frame and in slot indicated by starting slot number and subsequently the first UL resource in the other set of 'N' UL resources occurs at periodicity given by periodicity.

In an embodiment, whether these 'N' configured uplink resources in the set are used for repetition (i.e. UE transmits same TB in all these uplink resources) or only one amongst these resources are used for transmission (as described above), may be indicated in RRC signaling.

In the case of UL CG, UL CG repetition signaling may be used to handle the UL traffic jitter. The legacy CG repetition is originally introduced to improve the reliability by repetitive PUSCH transmission. gNB configures the repetitive UL grant in consecutive slots, with the same symbol allocation in each slot.

The repetition may be also used to reduce the latency. For example, when UL packet arrives slightly later than the first UL grant timing, the UL packet may be transmitted using the following repetitive CG UL grant without waiting for another CG grant periodicity. In this way, this repetition may be used to reduce the latency when UL traffic arrives a bit late due to the jitter. However, some enhancement to use this for XR traffic jitter handling is needed.

First, the legacy CG repetitions should be located in consecutive slot and the maximum possible length of repetition window is 8 slots with maximum repetition level 8, which seems too inflexible to handle various jitter distribution. Thus, it is proposed to introduce more flexible configuration of the repetitive CG for jitter handling. For example, the CG repetition with interval of multiple slots may be configured. Second, with the legacy CG repetition, the UE should retransmit the same packet even when the repetition is used not for the reliability improvement but for the latency reduction. Thus, we propose that CG skipping is applied (in all but one grant amongst the bundle of grants allocated for repetition) when the CG repetition is used to handle the XR traffic jitter, which may prevent UE from wasting energy.

In an embodiment, two new field (i.e., CG repetition interval and 1-bit indicator to allow single transmission for jitter handling) in configuredGrantConfiguration for CG type 1 may be signaled by gNB. If these new fields are indicated, UE uses a CG amongst the set of CGs per CG grant periodicity.

In accordance with an embodiment of the disclosure, a method performed by a terminal in a wireless communication system is provided. The method may comprises: receiving, from a base station, configuration information associated with a set of a plurality of downlink resources, the set being configured to occur periodically; monitoring the plurality of downlink resources of the set in a period for receiving downlink data, wherein the plurality of downlink resources are monitored sequentially; and in case that the downlink data is received in a downlink resource of the set in the period, skipping monitoring of the remaining one or more downlink resources of the set in the period.

In an embodiment, wherein the downlink resource is selected from among the plurality of downlink resources of the set based on a packet arrival.

In an embodiment, wherein the configuration information includes a plurality of downlink assignment configurations respectively corresponding to the plurality of downlink resources.

In an embodiment, wherein each of the plurality of downlink assignment configurations indicates a periodicity, time domain resource information and frequency domain resource information.

In an embodiment, wherein the configuration information further includes information indicating which of the plurality of downlink assignment configurations correspond to the same set.

In an embodiment, wherein the configuration information includes a parameter indicating a reference system frame number (SFN), a parameter indicating an offset with respect to the reference SFN, a parameter associated with a time domain allocation and a parameter indicating a periodicity.

In an embodiment, wherein a first downlink resource of the set occurs in a slot starting at the offset from the reference SFN.

In an embodiment, wherein the parameter associated with the time domain allocation indicates at least one symbol occupied by the first downlink resource in the slot.

In an embodiment, wherein the configuration information further includes a parameter indicating an interval or a gap between the first downlink resource and a second downlink resource of the set.

In accordance with an embodiment of the disclosure, a method performed by a base station in a wireless communication system is provided. The method may comprise: determining a downlink resource from among a set of a plurality of downlink resources, based on a packet arrival, wherein the remaining one or more downlink resources of the set are not configured for transmitting downlink data; transmitting, to a terminal, configuration information associated with the set of the plurality of downlink resources, wherein the set is configured to occur periodically; and transmitting, to the terminal, the downlink data in the determined downlink resource.

In an embodiment, wherein the plurality of the downlink resources are monitored sequentially.

In an embodiment, wherein the configuration information includes a plurality of downlink assignment configurations respectively corresponding to the plurality of downlink resources.

In an embodiment, wherein each of the plurality of downlink assignment configurations indicates a periodicity, time domain resource information and frequency domain resource information.

In accordance with an embodiment of the disclosure, a terminal in a wireless communication system is provided. The terminal may comprise: receive, from a base station via the transceiver, configuration information associated with a set of a plurality of downlink resources, the set being configured to occur periodically; monitor the plurality of downlink resources of the set in a period for receiving downlink data, wherein the plurality of downlink resources are monitored sequentially; and in case that the downlink data is received in a downlink resource of the set in the period, skip monitoring of the remaining one or more downlink resources of the set in the period.

In accordance with an embodiment of the disclosure, a base station in a wireless communication system is provided. The base station may comprise: a transceiver; and at least one processor coupled with the transceiver and configured to: determine a downlink resource from among a set of a plurality of downlink resources, based on a packet arrival, wherein the remaining one or more downlink resources of the set are not configured for transmitting downlink data; transmit, to a terminal via the transceiver, configuration information associated with the set of the plurality of downlink resources, wherein the set is configured to occur periodically; and transmit, to the terminal via the transceiver, the downlink data in the determined downlink resource.

Figure 19:
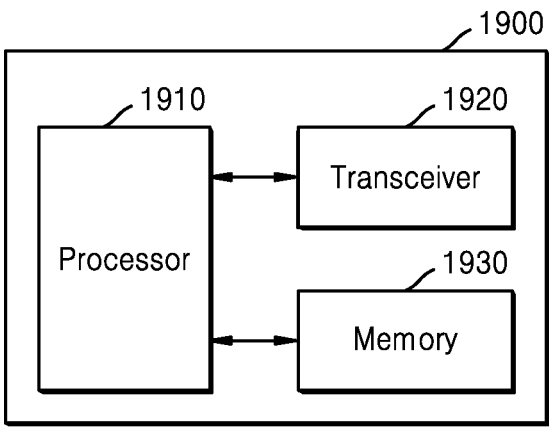
FIG. 19 is a diagram illustrating a UE 1900 according to an embodiment of the disclosure.

FIG. 19 is a diagram illustrating a UE 1900 according to an embodiment of the disclosure.

Referring to the FIG. 19, the UE 1900 may include a processor 1910, a transceiver 1920 and a memory 1930. However, all of the illustrated components are not essential. The UE 1900 may be implemented by more or less components than those illustrated in the FIG. 19. In addition, the processor 1910 and the transceiver 1920 and the memory 1930 may be implemented as a single chip according to another embodiment.

The aforementioned components will now be described in detail.

The processor 1910 may include one or more processors or other processing devices that control the proposed function, process, and/or method. Operation of the UE 1900 may be implemented by the processor 1910.

The transceiver 1920 may be connected to the processor 1910 and transmit and/or receive a signal. In addition, the transceiver 1920 may receive the signal through a wireless channel and output the signal to the processor 1910. The transceiver 1920 may transmit the signal output from the processor 1910 through the wireless channel.

The memory 1930 may store the control information or the data included in a signal obtained by the UE 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or compact disc read only memory (CD-ROM) and/or digital versatile disc (DVD) and/or other storage devices.

Figure 20:
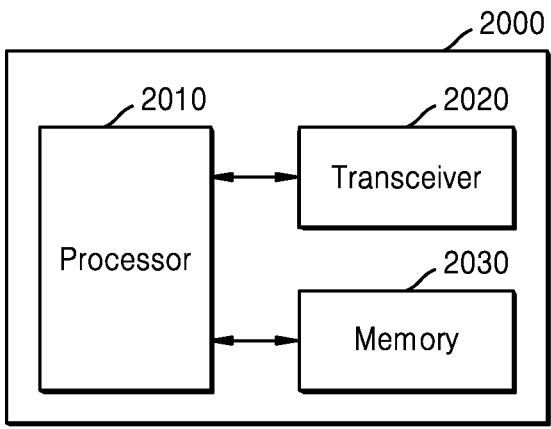
FIG. 20 is a diagram illustrating a base station 2000 according to an embodiment of the disclosure.

FIG. 20 is a diagram illustrating a base station 2000 according to an embodiment of the disclosure.

Referring to the FIG. 20, the base station 2000 may include a processor 2010, a transceiver 2020 and a memory 2030. However, all of the illustrated components are not essential. The base station 2000 may be implemented by more or less components than those illustrated in FIG. 20. In addition, the processor 2010 and the transceiver 2020 and the memory 2030 may be implemented as a single chip according to another embodiment. The aforementioned components will now be described in detail.

The processor 2010 may include one or more processors or other processing devices that control the proposed function, process, and/or method. Operation of the base station 900 may be implemented by the processor 2010.

The transceiver 2020 may be connected to the processor 2010 and transmit and/or receive a signal. The signal may include control information and data. In addition, the transceiver 2020 may receive the signal through a wireless channel and output the signal to the processor 2010. The transceiver 2020 may transmit a signal output from the processor 2010 through the wireless channel.

The memory 2030 may store the control information or the data included in a signal obtained by the base station 2000. The memory 2030 may be connected to the processor 2010 and store at least one instruction or a protocol or a parameter for the proposed function, process, and/or method. The memory 2030 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, configuration information associated with multiple configured uplink grants within a single period of a configured grant (CG) configuration, time domain related information, and information indicating a periodicity;
   identifying time domain resource information related to the multiple configured uplink grants, based on the configuration information, the time domain related information, and the information indicating the periodicity,
   wherein the identifying of the time domain resource information comprises:
      identifying a first symbol in which a first configured uplink grant from among the multiple configured uplink grants occurs, based on the time domain related information; and
      identifying a second symbol in which a second configured uplink grant from among the multiple configured uplink grants occurs, based on the first symbol and a number of symbols; and
   transmitting, to the base station, CG based uplink data, based on the identified time domain resource information.

2. The method of claim 1, wherein the time domain related information includes information indicating an offset of a resource with respect to a reference system frame number (SFN), information associated with an allocation of configured uplink grant in a time domain, and information indicating the reference SFN.

3. The method of claim 2, wherein the identifying of the first symbol comprises:
   identifying the first symbol, based on the information indicating the periodicity, the information indicating the offset, the information associated with the allocation of configured uplink grant, and the information indicating the reference SFN.

4. The method of claim 2, wherein the information associated with the allocation of the configured grant in the time domain includes a start symbol related value.

5. The method of claim 1, wherein the second configured uplink grant occurs the number of symbols after the first symbol.

6. The method of claim 1, wherein the first symbol corresponds to a first slot, and the second symbol corresponds to a second slot.

7. The method of claim 1, wherein the multiple configured uplink grants are configured to occur periodically with the periodicity.

8. The method of claim 1, further comprising:
   determining whether a configured uplink grant is to be used for a physical uplink shared channel (PUSCH) transmission.

9. A method performed by a base station in a wireless communication system, the method comprising:
   transmitting, to a terminal, configuration information associated with multiple configured uplink grants within a single period of a configured grant (CG) configuration, time domain related information, and information indicating a periodicity, wherein the configuration information, the time domain related information and the information indicating the periodicity are associated with time domain resource information related to the multiple configured uplink grants, wherein the time domain related information is associated with a first symbol in which a first configured uplink grant from among the multiple configured uplink grants occurs, and wherein the first symbol is associated with a second symbol in which a second configured uplink grant from among the multiple configured uplink grants occurs, the second symbol being related to the first symbol and a number of symbols; and receiving, from the terminal, CG based uplink data associated with the time domain resource information.

10. The method of claim 9, wherein the time domain related information includes information indicating an offset of a resource with respect to a reference system frame number (SFN), information associated with an allocation of configured uplink grant in a time domain, and information indicating the reference SFN.

11. The method of claim 10, wherein the information indicating the periodicity, the information indicating the offset, the information associated with the allocation of configured uplink grant, and the information indicating the reference SFN are associated with the first symbol.

12. A terminal in a wireless communication system, the terminal comprising:

at least one transceiver;

at least one processor communicatively coupled to the at least one transceiver: and at least one memory, communicatively coupled to the at least one processor, storing instructions executable by the at least one processor to cause the terminal to:

receive, from a base station, configuration information associated with multiple configured uplink grants within a single period of a configured grant (CG) configuration, time domain related information, and information indicating a periodicity, identify time domain resource information related to the multiple configured uplink grants, based on the configuration information, the time domain related information, and the information indicating the periodicity, wherein the identifying of the time domain resource information comprises:

identifying a first symbol in which a first configured uplink grant from among the multiple configured uplink grants occurs, based on the time domain related information; and identifying a second symbol in which a second configured uplink grant from among the multiple configured uplink grants occurs, based on the first symbol and a number of symbols, and transmit, to the base station, CG based uplink data, based on the identified time domain resource information.

13. A base station in a wireless communication system, the base station comprising:

at least one transceiver;

at least one processor communicatively coupled to the at least one transceiver; and at least one memory, communicatively coupled to the at least one processor, storing instructions executable by the at least one processor to cause the base station to:

transmit, to a terminal, configuration information associated with multiple configured uplink grants within a single period of a configured grant (CG) configuration, time domain related information, and information indicating a periodicity, wherein the configuration information, the time domain related information and the information indicating the periodicity are associated with time domain resource information related to the multiple configured uplink grants, wherein the time domain related information is associated with a first symbol in which a first configured uplink grant from among the multiple configured uplink grants occurs, and wherein the first symbol is associated with a second symbol in which a second configured uplink grant from among the multiple configured uplink grants occurs, the second symbol being related to the first symbol and a number of symbols, and receive, from the terminal, CG based uplink data associated with the time domain resource information.

* * * * *